(12) United States Patent
Endres et al.

(10) Patent No.: US 8,889,784 B2
(45) Date of Patent: Nov. 18, 2014

(54) CROSSLINKABLE POLYMER DISPERSION

(75) Inventors: Silvia I. Endres, Zurich (CH); Bernard Fouchet, Strasboug (FR); Eva-Maria Michalski, Sinzheim (CH); Ursula Seiler, Buhl (DE)

(73) Assignee: Dow Global Technologies LLC, Midland, MI (US)

( * ) Notice: Subject to any disclaimer, the term of this patent is extended or adjusted under 35 U.S.C. 154(b) by 187 days.

(21) Appl. No.: 12/959,690

(22) Filed: Dec. 3, 2010

(65) Prior Publication Data

US 2011/0136966 A1 Jun. 9, 2011

Related U.S. Application Data

(60) Provisional application No. 61/283,562, filed on Dec. 7, 2009.

(51) Int. Cl.
| | |
|---|---|
| *C08L 33/02* | (2006.01) |
| *C08L 33/04* | (2006.01) |
| *C08L 35/06* | (2006.01) |
| *C08J 3/24* | (2006.01) |
| *C08J 3/26* | (2006.01) |
| *C08J 5/24* | (2006.01) |
| *D21H 19/16* | (2006.01) |
| *D21H 17/33* | (2006.01) |
| *D21H 17/37* | (2006.01) |

(52) U.S. Cl.
CPC . *C08J 5/24* (2013.01); *D21H 19/16* (2013.01); *D21H 17/33* (2013.01); *D21H 17/37* (2013.01)
USPC ............ 524/556; 524/560; 524/577; 525/385

(58) Field of Classification Search
USPC .......................... 524/556, 560, 577; 525/385
See application file for complete search history.

(56) References Cited

U.S. PATENT DOCUMENTS

| | | | |
|---|---|---|---|
| 5,068,153 A | 11/1991 | Barsotti et al. | |
| 5,447,972 A | 9/1995 | D'Allest | |
| 5,670,226 A * | 9/1997 | Yoshizawa et al. | 428/40.1 |
| 5,753,362 A | 5/1998 | Kawase | |
| 5,767,188 A * | 6/1998 | Kamikuri et al. | 524/507 |
| 6,180,742 B1 * | 1/2001 | Kato et al. | 526/328.5 |
| 7,112,625 B2 * | 9/2006 | Nakayama et al. | 524/504 |
| 7,396,868 B2 * | 7/2008 | Tosaki et al. | 524/377 |
| 7,932,317 B1 * | 4/2011 | Lettmann | 524/502 |
| 2005/0004309 A1 * | 1/2005 | Gerst et al. | 525/107 |
| 2007/0249780 A1 | 10/2007 | Bakeev et al. | |
| 2008/0032055 A1 * | 2/2008 | Ogawa et al. | 427/402 |

FOREIGN PATENT DOCUMENTS

| | | |
|---|---|---|
| EP | 0520266 | 12/1992 |
| JP | 09235332 | 9/1997 |
| JP | 2003277636 | 10/2003 |
| JP | 2003073637 | 12/2003 |

OTHER PUBLICATIONS http://www.mgc.co.jp/eng/products/rstuxy/06.html , 2007.*
http://www.nagasechemtex.co.jp/en/products/denalist.html, 2005.*
Lahtinen, "Synthesis of Novel Reactive Coalescing Agents and Their Application in a Latex Coating" Journ. Appl. Polym. Sci. v87, pp. 610-615, 2003.
Wu, "Synthesis of model acrylic latexes for crosslinking with cycloaliphatic diepoxides" v41 pp. 81-92, 2000.
Wu, "Crosslinking of acrylic latex coatings with cycloaliphatic diepoxide" Polymer v41 pp. 2017-2028, 2000.
Geurink, Analytical aspects and film properties of two-pack acetoacetate functional latexes, Prog. In Org. Coatings, v27, pp. 73-78, 1996.
Pham, "Polymer interdiffusion vs. Cross-Linking in Carboxylic Acid-Carbodiimide latex Films. Effect of Annealing Temperature, Reactive Group Concentration, and Carbodiimide substituent," Macromolecules, v39, pp. 1425-1435, 2006.

* cited by examiner

*Primary Examiner* — Satya Sastri
(74) *Attorney, Agent, or Firm* — Carl P. Hemenway

(57) ABSTRACT

There is provided a stable aqueous dispersion comprising
(a) dispersed particles of one or more film-forming polymer that comprises 1% to 10% by weight, based on the solid weight of said polymer, of polymerized units of one or more functional monomer, wherein said functional monomer is selected from acid-functional monomers or amine-functional monomers or a mixture thereof, and
(b) one or more multiglycidyl compound having 4 or more glycidyl groups per molecule.

10 Claims, No Drawings

CROSSLINKABLE POLYMER DISPERSION

This application claims the benefit of priority under 35 U.S.C. §119(e) of U.S. Provisional Patent Application No. 61/283,562 filed on Dec. 7, 2009.

BACKGROUND

It is desirable to provide a dispersion that contains one or more polymer in the form of dispersed particles in an aqueous medium. It is also desirable to provide such dispersions that are designed so that, when the dispersion is applied to a substrate and the water is allowed to evaporate, the particles are capable of forming a coherent film that provides good resistance to water and good resistance to alcohol. In the past, attempts to design such dispersions were hampered because dispersions could be designed that had good water resistance or good alcohol resistance but not both.

When such a coherent film is made, it is desirable that the polymers in the final film be crosslinked. In the past, such crosslinking required heating the film to relatively high temperature for relatively long times.

M. Lahtinen, et. al. (Journal of Applied Polymer Science, vol. 87, no. 4, pp. 610-615, 2003), describes mixtures of a latex polymer and a glycidyl compound, where the latex polymer contains 3% by weight of acrylic acid and the glycidyl compound contains 1, 2, or 3 glycidyl groups per molecule. It is desired to provide dispersions that have one or more of the following advantages: the dispersions are stable; the dispersions can produce films that have both good water resistance and good alcohol resistance; or the dispersions can achieve useful extent of crosslinking by heating to relatively low temperatures or by heating for relatively short times or both.

STATEMENT OF THE INVENTION

In one aspect of the present invention, there is provided a stable aqueous dispersion comprising
(a) dispersed particles of one or more film-forming polymer that comprises 1% to 10% by weight, based on the solid weight of said polymer, of polymerized units of one or more functional monomer, wherein said functional monomer is selected from acid-functional monomers or amine-functional monomers or a mixture thereof, and
(b) one or more multiglycidyl compound having 4 or more glycidyl groups per molecule.

DETAILED DESCRIPTION

A "polymer," as used herein and as defined by F W Billmeyer, J R. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

A compound that is capable of undergoing chemical reaction to become one of the repeat units in a polymer is known as a "monomer." The resulting repeat unit is known herein as "polymerized unit" of that monomer.

As used herein, a "vinyl" polymer is a polymer formed by polymerization of monomers, each of which has at least one carbon-carbon double bond that participates in the polymerization reaction. Vinyl polymers may be homopolymers or copolymers. Monomers capable of becoming repeat units in a vinyl polymer are known as "vinyl monomers."

As used herein "(meth)acrylic" means "acrylic or methacrylic," and "(meth)acrylate" means acrylate or methacrylate.

Polymer molecular weights can be measured by standard methods such as, for example, size exclusion chromatography (SEC, also called gel permeation chromatography or GPC). Generally, polymers have weight-average molecular weight (Mw) of 1,000 or more. Polymers may have extremely high Mw; some polymers have Mw above 1,000,000; typical polymers have Mw of 1,000,000 or less. Some polymers are characterized by Mn, the number-average molecular weight.

Some polymers are crosslinked, and crosslinked polymers are considered to have infinite Mw. In such case due to their insolubility in solvents, size exclusion chromatography cannot be performed and the polymer is characterized by the so called gel % test. As used herein "weight of polymer" means the dry weight of polymer.

One method of characterizing polymers is the glass transition temperature (Tg) as measured by Differential Scanning calorimetry.

As used herein, a "dispersion" is a composition in which particles of one or more solid substance are distributed throughout the volume of a liquid substance. The liquid substance in a dispersion is herein called the liquid "medium." A dispersion is considered "aqueous" herein if the liquid medium contains 45% or more water by weight, based on the weight of the liquid medium.

A dispersion is considered herein to be "stable" if the solid particles do not collect together when the dispersion is allowed to stand without agitation at 25° C. and normal gravity for 24 hours. The particles in a dispersion that is unstable may collect together by settling to the bottom of the container or by floating to the top surface of the liquid medium or by agglomerating somewhere in the volume of the liquid medium, or by a combination thereof. If particles collect together at the top or the bottom of the container, a phase separation will be visible. Also, instability can be detected by examining a container after it has stood undisturbed for a time and measuring various properties (such as, for example, solids, particle size, gel %, and swell index) at the top of the container and at the bottom of the container; any significant difference between the top measurement and the bottom measurement is an indication of instability.

A polymer is considered herein to be a "film-forming" if the polymer has the property at 25° C. that, if a dispersion of particles of that polymer were to be provided, and if a layer of that dispersion were placed on a substrate, and if the liquid medium were allowed to evaporate, then the particles of the polymer would fuse together sufficiently to provide a film that had appreciable tensile strength. The property of being a film-forming polymer is intrinsic to that polymer regardless of whether the polymer exists in any specific physical configuration such as dispersed particles, solid block, etc.

As used herein, a "glycidyl compound" is a compound, the molecule of which contains one or more glycidyl group, which has the structure

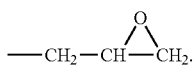

A "multiglycidyl compound" is a compound that contains two or more glycidyl groups per molecule. A compound that contains 4 or more glycidyl groups per molecule is known herein as a "supertetraglycidyl compound." The portion of a molecule of a glycidyl compound that is not part of any glycidyl group is known herein as the "skeleton" of that glycidyl compound.

As used herein, a "glycidyl ether" is a compound that contains one or more glycidyl group attached to the skeleton through an ether linkage. That is, a glycidyl ether compound contains the structure

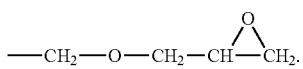

As used herein, the pKa of a compound is the negative logarithm of the acid dissociation constant of that compound in water at 25° C. A compound herein is considered acidic if it has pKa of less than 7.

As used herein, "acid-functional monomers" are acidic compounds that have a reactive group that participates in a polymerization reaction, and the group with the labile hydrogen that makes the compound acidic is not the reactive group that participates in the polymerization reaction. Acid-functional vinyl monomers have a carbon-carbon double bond that can participate in a vinyl polymerization reaction and also have a group with a labile hydrogen that gives the monomer compound a pKa of less than 7.

As used herein, a basic compound is a compound whose conjugate acid has pKa of greater than 7. As used herein, a "fugitive base" is a basic compound that will evaporate when exposed to standard ambient atmosphere at 25° C. and one atmosphere pressure.

The polymer in the composition of the present invention may be any type of polymer. Suitable polymers include, for example, urethane polymers, vinyl polymers, other types of polymers, and mixtures thereof.

In some embodiments, a vinyl polymer is used. Some suitable vinyl monomers include, for example, aromatic vinyl monomers, (meth)acrylate monomers, unsaturated sulfonic acid monomers, unsaturated diacids, alkenes, hydrocarbon dienes, non-hydrocarbon multi-ethylenically unsaturated monomers, substituted versions thereof, and mixtures thereof. In some embodiments, every film-forming polymer in the composition is a vinyl polymer.

Suitable aromatic vinyl monomers include, for example, styrene and substituted styrenes (such as, for example, alpha-methyl styrene, para-ethylstyrene, and vinyltoluene).

Suitable (meth)acrylate monomers include, for example, (meth)acrylic acid, unsaturated diacids, esters of (meth)acrylic acid (also called (meth)acrylate esters), amides of (meth)acrylic acid, and substituted versions thereof. Some suitable substituted esters of (meth)acrylic acid include, for example, hydroxyalkyl (meth)acrylate esters and aminoalkyl (meth)acrylate esters.

Some suitable diacids include, for example, fumaric acid, itaconic acid and maleic acid.

Some suitable alkenes include, for example, ethylene and propylene. Some substituted alkenes include, for example, vinyl acetate.

Some suitable hydrocarbon dienes include, for example, dienes with 4 to 6 carbon atoms. Suitable dienes include, for example, butadiene and isoprene.

Some suitable non-hydrocarbon multi-ethylenically unsaturated monomers include, for example, diallylmaleate, ethyleneglycoldimethacrylate and allylmethacrylate.

In some embodiments, one or more aromatic vinyl monomer is used. In some embodiments, one or more substituted or unsubstituted (meth)acrylate ester is used. In some embodiments, one or more diene is used. In some embodiments, one or more carboxyl functional monomer is used that is selected from (meth)acrylic acid and unsaturated diacids. In some embodiments, styrene and one or both of acrylic acid and methacrylic acid are used, optionally with one or more additional monomer. In some embodiments, the monomers used include styrene, one or more unsubstituted (meth)acrylate ester, one or both of acrylic acid and methacrylic acid, and optionally one or more additional monomer.

In some embodiments in which a substituted or unsubstituted alkyl (meth)acrylate ester is used, the alkyl group has 1 to 18 carbon atoms. In some embodiments, that alkyl group has 8 or fewer carbon atoms, or preferably 6 or fewer carbon atoms. In some embodiments, that alkyl group is unsubstituted.

In some embodiments in which a vinyl polymer is used, the vinyl monomers that are used may be chosen using the Fox equation so that the resulting vinyl polymer has Tg in the desired range. For example, in some embodiments, vinyl aromatic monomer is copolymerized with one or more diene or with one or more unsubstituted alkyl (meth)acrylate monomer or with a combination thereof, and the specific monomers and the specific amount of each monomer is chosen so that, according to the Fox equation, the resulting polymer will have Tg within the desired range.

In embodiments in which one or more aromatic vinyl monomer is used, the total amount of all vinyl aromatic monomer is 10% to 90% by weight, based on the total dry weight of the polymer. In embodiments in which one or more diene is used, the total amount of all dienes is 10% to 90% by weight, based on the total dry weight of the polymer. In embodiments in which one or more unsubstituted alkyl (meth)acrylate ester is used, the total amount of all unsubstituted alkyl (meth)acrylate esters is 10% to 90% by weight, based on the total dry weight of the polymer.

In embodiments in which one or more acid-functional monomer is used, the total amount of all acid functional monomers is 1% to 10% by weight, based on the total dry weight of the polymer.

In some embodiments, a polymer is used that does not have any methylolamide groups.

In some embodiments, a polymer is used that has no additional functional groups. As used herein, an "additional functional group" is any chemical group capable of forming crosslinks other than carboxyl groups, ester linkages, and amine groups. In some embodiments, a polymer is used that has no additional functional group and has no amine group.

In the practice of the present invention, a polymer is used that is a film-forming polymer. In some embodiments, a polymer is used that has Tg of 35° C. or lower; or 22° C. or lower. In some embodiments, a polymer is used that has Tg of −25° C. or higher; or −10° C. or higher; or 5° C. or higher.

In the practice of the present invention, one or more polymer is present as dispersed particles in an aqueous medium. In some embodiments, the aqueous medium contains water in the amount of, by weight based on the weight of the aqueous medium, 45% or more; or 50% or more; or 75% or more; or 90% or more.

It is sometimes useful to characterize a composition by the "polymer solids," which is defined herein as the dry weight of polymer expressed as a percentage based on the weight of the total composition. In some embodiments, the composition of the present invention has polymer solids of 10% or more; or 20% or more; or 40% or more. Independently, in some embodiments, the composition of the present invention has polymer solids of 60% or less.

In some embodiments, the dispersed particles of polymer in the aqueous medium have median particle size of between 30 nanometers and 5 micrometers. In some embodiments, the dispersed particles of polymer have median particle size of 50 nanometers or higher; or 100 nanometers or higher. In some embodiments, the dispersed particles of polymer have median particle size of 1 micrometer or lower; or 500 nanometers or lower.

In some embodiments, the aqueous dispersion has pH of 7.5 or higher. In some of such embodiments, the aqueous dispersion contains one or more water-soluble fugitive base. It is contemplated that, if such a dispersion were applied to a substrate and the water were allowed to evaporate, as the water proceeded to evaporate, the fugitive base would also proceed to evaporate, and the conditions would become acidic in the residue of the dispersion that remained on the substrate.

Some stable aqueous dispersions of film-forming polymers exist at pH below 7. In some embodiments, one or more basic compound is added to such a dispersion to raise the pH to 7.5 or higher. In some of such embodiments, one or more fugitive base is added. In some of such embodiments, the amount of fugitive base and the amount of non-fugitive basic compounds are adjusted so that, if the fugitive base were not present, the pH of the dispersion would be below 7.

Some suitable fugitive bases have a boiling point at one atmosphere pressure of less than 20° C., or less than 0° C. Some suitable fugitive bases are, for example ammonia, methylamine, other alkyl amines, and mixtures thereof. In some embodiments, ammonia is used.

In some embodiments, a stable aqueous dispersion of particles of film-forming polymer is produced by a process of aqueous emulsion polymerization. In some of such embodiments, the polymerization is conducted at pH below 7, and the resulting stable dispersion of polymer particles has pH below 7. In some of such embodiments, one or more fugitive base is added to the dispersion to bring the pH to 7.5 or higher.

The composition of the present invention contains one or more supertetraglycidyl compound. In some embodiments, one or more supertetraglycidyl compound is used that is also a glycidyl ether. In some of such embodiments, one or more supertetraglycidyl compound in used in which every glycidyl compound is attached to the skeleton through an ether linkage.

In some embodiments, the composition of the present invention contains no multiglycidyl compound that has 3 or fewer glycidyl groups.

In some embodiments, one or more supertetraglycidyl compound is used that has no cyclic structure other than the epoxide ring. In some embodiments, every supertetraglycidyl compound that is used has no cyclic structure other than the epoxide ring.

Two examples of suitable supertetraglycidyl compounds are pentaerythritol tetraglycidyl ether, which has the formula

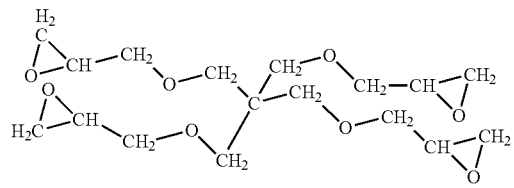 [SMILES: C(OCC(COCC1CO1)(COCC1CO1)COCC1CO1)C1CO1]

and polyglycerol-3-polyglycidyl ether, which has the formula

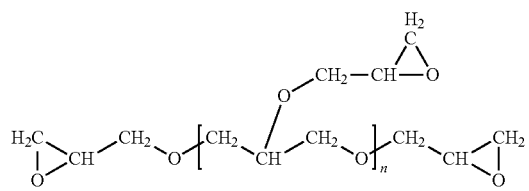

where n is 3. Other examples of suitable supertetraglycidyl compounds are analogs of polyglycerol-3-polyglycidyl ether in which n is 2 or n is greater than 3.

In some embodiments, a supertetraglycidyl compound is used that additionally has an amino group, a carboxyl group, surface-active functionality (i.e., both a hydrophobic group and a hydrophilic group), or a combination thereof. In some embodiments, no supertetraglycidyl compound is used that has any of amino groups, carboxyl groups, or surface-active functionality.

In some embodiments, the amount of all supertetraglycidyl compounds is 0.1% by weight to 20% by weight based on the dry weight of the polymer. In some embodiments, the amount of all supertetraglycidyl compounds is, in percent by weight based on the dry weight of the polymer, 0.2% or more; or 0.5% or more. In some embodiments, the amount of all supertetraglycidyl compounds is, in percent by weight based on the dry weight of the polymer, 15% or less; or 10% or less.

In some embodiments, a supertetraglycidyl compound is used that has molecular weight of 2,000 or less; or 1,000 or less; or 600 or less. In some embodiments, every supertetraglycidyl compound in the composition has molecular weight of 1,000 or less. In some embodiments, a supertetraglycidyl compound is used that is not a polymer that contains one or more polymerized unit of any substituted or unsubstituted (meth)acrylate monomer.

In some embodiments, the composition contains no compound that is capable of forming crosslinks with the polymer chains in the dispersed particles of the present invention and that has any silicon atoms. In some embodiments, the composition contains no compound that is capable of forming crosslinks with the polymer chains in the dispersed particles of the present invention and that has any nitrogen atoms. In some embodiments, the composition contains no compound that is capable of forming crosslinks with the polymer chains in the dispersed particles of the present invention and that is not a multiglycidyl compound. In some embodiments, the composition contains no carbodiimide compound. In some embodiments, the composition contains no compound that is capable of forming crosslinks with the polymer chains in the dispersed particles of the present invention and that is not a supertetraglycidyl compound.

The composition of the present invention is a stable dispersion. In some embodiments, the stable dispersion is produced by a process that includes exposing a mixture of all the ingredients to high-speed emulsification. One example of apparatus capable of high-speed emulsification is a rotor/stator mixer capable of producing pigment dispersions. In some of such rotating-disk dispersers, the rim speed is 1,000 cm/sec or faster. In some of such rotating-disk dispersers, the disk rotates at 4,000 revolutions per minute or faster. Other apparatus that may also be used for high-speed emulsification include, for example, homogenizers, emulsifiers, ultrasonic devices, in-line emulsifiers, and apparatus that combine elements of other suitable devices. It is contemplated that any suitable high-speed emulsification apparatus will have equivalent emulsifying effect to the emulsifying effect produced by a suitable rotating-disk disperser.

In some embodiments, a dispersion of the present invention is applied to a substrate. In some embodiments, the dispersion so applied may, for example, form a layer on the surface of the substrate. In other embodiments, the dispersion so applied may migrate into pores in the body of the substrate, either to some depth that is less than the thickness of the substrate or throughout the body of the substrate. When the dispersion migrates into pores in the body of the substrate to a depth that is more than half the thickness of the substrate, the process of applying the dispersion to the substrate is known herein as "saturating" the substrate.

Some suitable substrates are porous. Some suitable porous substrates are made of fibers. Some suitable substrates made of fibers include, for example, wood, paper, woven fabric, nonwoven fabric, other fibrous substrates, and combinations thereof.

In some embodiments, after a dispersion of the present invention is applied to a substrate, the separate particles of polymer merge to form a polymeric mass that is no longer separate particles. While the present invention is not bound by theory, it is contemplated that, during and/or after evaporation of water, polymer chains in one particle diffuse to intertwine among polymer chains in an adjacent particle. The process of merging may in some embodiments be partial, so that some effects of the boundaries between particles remain. In other embodiments the merging may be extensive, so that the polymer mass behaves as a single coherent mass, without residual effects from particle boundaries.

In some embodiments, after a dispersion of the present invention is applied to a substrate, the polymer undergoes crosslinking. Crosslinking may take place any time after the application to substrate. Crosslinking may take place prior to evaporation of the water, during evaporation of the water, after evaporation of the water, or any combination thereof. In some embodiments, a crosslink between sites on polymer chains is built when two glycidyl groups on one supertetraglycidyl compound react with two functional groups (either amine groups or acid groups) attached to different polymer chains or attached to the same polymer chain.

While the present invention is not bound by theory, it is contemplated that the crosslinking reaction involving supertetraglycidyl compounds is catalyzed by acid conditions. Then the crosslinking reaction is prevented in the dispersion when the pH is above 7.5 but proceeds when the dispersion is applied to substrate and the water evaporates, which causes the pH to fall below 7.

Among embodiments in which crosslinking takes place, crosslinking may take place prior to merging of polymer particles, during merging of polymer particles, after merging of polymer particles, or any combination thereof. While the present invention is not bound by theory, it is contemplated that it is desirable to have both extensive merging of the polymer particles and extensive crosslinking of the polymer chains throughout the mass of the polymer.

In some embodiments, an optional acid may be included in the composition. It is contemplated that such an acid could act as a catalyst during the crosslinking process. In some embodiments, such acids have pKa of less than 6. In some embodiments, p-toluenesulfonic acid is included. When such an acid is included, the amount is, by weight of acid per hundred parts by dry weight of polymer in the composition, 0.05 parts or more; or 0.1 parts or more. Among some embodiments in which such an acid is included, the amount is, by weight of acid per hundred parts by dry weight of polymer in the composition, 2 parts or less; or 1 part or less. In other embodiments, no such optional acid is included.

In some embodiments, after application to substrate, the composition is heated to 150° C. or lower for 120 minutes or less. In some embodiments, after application to substrate, the composition is heated to 140° C. or lower for 110 minutes or less. In some embodiments, after application to substrate, the composition is heated to 110° C. or lower for 40 minutes or less.

Other compounds (i.e., compounds other than the polymers, the glycidyl compounds, and the optional acids described herein above) may optionally be included in the composition of the present invention. Some of such other compounds may be put into the composition because they are inconvenient to remove from required ingredients. For example, if polymer particles are used that were produced by aqueous emulsion polymerization, the dispersion of polymer particles will include compounds left from the polymerization process such as, for example, surfactants and initiator fragments. Other compounds may be used, such as, for example, one or more of the following: surfactants, wetting agents, antifoaming agents, pigments, dispersants, catalysts, non-film-forming resins, and mixtures thereof.

In some embodiments, an epoxy-functional surfactant is used. In some of such embodiments, epoxy-functional surfactant, supertetraglycidyl compound, and water are mixed together and exposed to high-speed emulsification to produce an inverse emulsion. The inverse emulsion can then be mixed with a dispersion of polymer particles. In other embodiments, no epoxy-functional surfactant is used.

In some embodiments, a water soluble epoxy resin crosslinker is used which is added to the aqueous polymer dispersion under gentle mixing due to its water solubility property.

It is to be understood that for purposes of the present specification and claims that each operation disclosed herein is performed at 25° C. unless otherwise specified.

EXAMPLES

In the Examples below, the following definitions and abbreviations are used.

Latex Polymer #1 ("L1") is a polymer produced by aqueous emulsion polymerization with a Tg of 18° C. Latex Polymer #1 fits the following profile:
  30% to 70% by weight vinyl aromatic monomer
  30% to 70% by weight ester of (meth)acrylic acid
  2% to 7% by weight (meth)acrylic acid.

Latex Polymer #2 ("L2") was similar to L1 except that L2 had 4% methacrylic acid and 2.5% acrylic acid.

Latex Polymer #3 ("L3") was similar to L1 except that the monomer choice was adjusted to reach Tg of 28° C., and the particle size was 160 nanometers.

Latex Polymer #4 ("L4") was similar to L1 except that the monomer choice was adjusted to reach Tg of 26° C., and the monomers included 1% of methacrylic acid and 0.2% allyl methacrylate.

Latex Polymer #5 ("L5") was similar to L1 except that the monomer choice was adjusted to reach Tg of 16° C., and the monomers included 0.5% allyl methacrylate.

Latex Polymer #6 ("L6") was a two-phase composition. Each of the phases was similar to L1. The first phase, 70% by solid weight based on the solid weight of L6, had Tg of 32° C. and contained 2.5% methacrylic acid. The second phase, 30% by solid weight based on the solid weight of L6, was polymerized in the presence of the first phase, and had Tg of 15° C. and contained 1% acrylic acid.

Latex Polymer #7 ("L7") was a two-phase composition. Each of the phases was similar to L1. The first phase, 70% by solid weight based on the solid weight of L7, had Tg of 32° C. and contained 2.25% methacrylic acid and 0.2% allyl methacrylate. The second phase, 30% by solid weight based on the solid weight of L7, was polymerized in the presence of the first phase, had Tg of 17° C. and contained 1.5% acrylic acid.

| | |
|---|---|
| HSE | mixture made by high-speed emulsification |
| HS | High shear mixing |
| ID | Inverse Dispersion (made as described herein below) |
| E-CX | water soluble epoxy resin crosslinker |
| E-FS | epoxy-functional surfactant |
| pbw | parts by weight |
| R-11 | Polypox R-11 (cyclohexanedimethanoldiglycidylether) |
| R11D | ID of R-11 (42.3 pbw) with E-F Surf (15.5 pbw) |
| R-16 | Polypox R-16 (pentaerithritol glycidyl ether) |
| R16D | ID of R-16 (42.6 pbw) with E-F Surf (15 pbw) |
| R-9 | Polypox R-9 (polyglycerol-3-polyglycidyl ether) |
| R9D | ID of R-9 (46 pbw) with E-F Surf (8 pbw) |
| XL | crosslinker |
| W78 | Wetlink ™ 78 epoxysilane, from Momentive Performance Materials |
| XL-702 | Polycarbodiimide XL-72, from Picassian Polymers a business unit of Stahl Holdings Bv. |
| EX-9345 | Polycarbodiimide EX-9345, from Picassian Polymers a business unit of Stahl Holdings Bv. |

Preparation of Inverse Dispersion (Id): Glycidyl Ether and Epoxy-Functional surfactant were placed in a metallic beaker and stirred at 2000 rpm for 5 min Deionized water was added, 2 g at a time. After each addition of 2 g of water, a drop of the mixture was led down into an aluminum pan containing deionized water. When the drop diffuses immediately into the water, the process is stopped.

Gel % test: Aqueous polymer dispersions are applied at wet thickness of 400 micrometers on a polyethyleneterephthalate ("PET") Mylar foil. After drying latex film at 50° C. and 30 minutes and curing at 100 or 130° C. as appropriate, small amount of latex film (initial film weight) is left in toluene—the solvent used in this case—for 24 hours. The undissolved swollen polymer is filtered on a nylon screen and weighed (swollen polymer weight). It is then dried three hours at 130° C. After drying the undissolved polymer weight is measured (final dried film weight). Gel % is calculated as:

100×(final dried film weight)/(initial film weight)

Swell Index (SWI) test: swelling index is calculated as:

[(swollen polymer weight)−(final dried polymer weight)]/(final dried film weight)

Film Preparation: Aqueous dispersion was applied to polyethyleneterephthalate Mylar foil at wet thickness of 400 micrometers or 600 micrometers. Film was dried at 50° C. for 20 min. The dried film was then heated again in a ventilated oven for 30 min at either 80° C. or at 130° C. The film was then allowed to equilibrate for 24 hours to 3 days in a room at 20° C. and 50% humidity. Samples that received no further heating are denoted herein as "30/80" samples. Some samples received additional heat treatment of 60 min at 150° C.; these are denoted "60/150."

Solids % was measured by taking a sample of aqueous dispersion, weighing it (wet weight), then drying it one hour at 130° C., then weighing it again (dry weight). The solids % is 100×(dry weight)/(wet weight).

Flexibility Rating ("Flex"): Films were tested by hand, and the flexibility was judged by the following scale: 1=soft; 2=flexible; 3=a bit hard; 4=getting hard; 5=hard; 6=harder.

Films were observed visually ("V is") and judged by the following scale: 1=clear; 2=slight yellow; 3=yellow; 4=very yellow; 5=yellow and opaque; 6=very strong yellow and opaque.

Solvent resistance of films was tested by saturating a piece of cotton wool with solvent, placing it on a film, covering it with a glass dish to prevent evaporation. After a certain duration, the film was inspected and rated as follows:
1=totally white or destroyed;
2=different coloration and gloss, possibly with whitening;
3=loss in gloss or color, visible white shadow
4=small loss in gloss (visible only from some angles)
5=no visible influence on the film Tensile strength was tested on film samples of 75 mm length, 10 mm width, with center part width of 5 mm. The punch press was NAEF 22/028. Tensile tests were performed according to ASTM D2370-92 using a Houndfield 5000 extensiometer with a crosshead speed of 100 mm/minute.

Example 1

Samples C1 Through 28

Samples were prepared and tested as follows. Amounts listed are parts by weight of solid material. Sample numbers beginning with "C" denote comparative samples. Results listed as "n" means the test was not performed.

| | C1 | C2 | C3 | C4 | C5 | C6 | C7 |
|---|---|---|---|---|---|---|---|
| Latex | L1 | L1 | L1 | L1 | L1 | L1 | L1 |
| pbw of Latex | 100 | 100 | 100 | 100 | 100 | 100 | 100 |
| XL | none | E-CX | E-CX | E-CX | R11D | R11D | R11D |
| pbw of XL | 0 | 1 | 5 | 10 | 1 | 5 | 10 |
| 30/80 Gel % | 46.0 | 51.2 | 63.2 | 63.2 | 79.8 | 81.0 | 69.2 |
| 30/80 SWI | 28.8 | 15.5 | 15.5 | 17.3 | 9.0 | 7.7 | 11.7 |
| 60/150 Gel % | 50.4 | 59.8 | 73.9 | 80.5 | 70.9 | 85.8 | 87.4 |
| 60/150 SWI | 22.2 | 15.8 | 9.0 | 7.2 | 12.3 | 6.6 | 5.5 |
| 60/150 Vis | 1 | 1 | 1 | 1 | 1 | 1 | 1 |
| 60/160 Flex | 2 | 4 | 5 | 6 | 3 | 3 | 1 |

-continued

|  | 8 | 9 | 10 | 11 | 12 | 13 |
|---|---|---|---|---|---|---|
| Latex | L1 | L1 | L1 | L1 | L1 | L1 |
| pbw of Latex | 100 | 100 | 100 | 100 | 100 | 100 |
| XL | R16D | R16D | R16D | R9D | R9D | R9D |
| pbw of XL | 1 | 5 | 10 | 1 | 5 | 10 |
| 30/80 Gel % | 86.9 | 93.5 | 92.8 | 90.5 | 96.1 | 96.0 |
| 30/80 SWI | 7.4 | 3.5 | 2.4 | 5.8 | 2.4 | 2.0 |
| 60/150 Gel % | 87.6 | 93.8 | 93.7 | 90.0 | 95.4 | 95.5 |
| 60/150 SWI | 5.9 | 2.9 | 2.2 | 4.8 | 2.3 | 1.9 |
| 60/150 Vis | 1 | 1 | 1 | 1 | 2 | 2 |
| 60/160 Flex | 2 | 2 | 2 | 3 | 2 | 1 |

|  | C14 | C15 | C16 | C17 | C18 | C19 | C20 |
|---|---|---|---|---|---|---|---|
| Latex | L2 | L2 | L2 | L2 | L2 | L2 | L2 |
| pbw of Latex | 100 | 100 | 100 | 100 | 100 | 100 | 100 |
| XL | none | E-CX | E-CX | E-CX | R11D | R11D | R11D |
| pbw of XL | 0 | 1 | 5 | 10 | 1 | 5 | 10 |
| 30/80 Gel % | 70.6 | 72.7 | 80.9 | 84.5 | 77.7 | 84.1 | 80.9 |
| 30/80 SWI | 13.9 | 13.0 | 9.0 | 6.6 | 11.1 | 7.0 | 6.8 |
| 60/150 Gel % | 40.1 | 57.5 | 82.9 | 88.0 | 72.9 | 88.1 | 86.9 |
| 60/150 SWI | 33.1 | 19.1 | 7.7 | 5.2 | 11.3 | 6.0 | 5.3 |
| 60/150 Vis | 2 | n | n | n | n | n | n |
| 60/160 Flex | 2 | n | n | n | n | n | n |

|  | 21 | 22 | 23 | 24 | 25 | 26 | 27 | 28 |
|---|---|---|---|---|---|---|---|---|
| Latex | L2 | L2 | L2 | L2 | L2 | L2 | L2 | L2 |
| pbw of Latex | 100 | 100 | 100 | 100 | 100 | 100 | 100 | 100 |
| XL | R16D | R16D | R16D | R9D | R9D | R9D | R-9 | R-9 |
| pbw of XL | 1 | 5 | 10 | 1 | 5 | 10 | 5 | 10 |
| 30/80 Gel % | 93.4 | 95.1 | 92.5 | 93.0 | 96.1 | 95.1 | 96.3 | 95.4 |
| 30/80 SWI | 5.0 | 3.1 | 2.95 | 5.89 | 3.08 | 2.67 | 3.1 | 2.55 |
| 60/150 Gel % | 91.6 | 95.0 | 93.5 | 89.3 | 95.5 | 95.3 | 95.8 | 95.6 |
| 60/150 SWI | 4.5 | 2.8 | 2.4 | 5.3 | 2.7 | 2.2 | 2.8 | 2.6 |
| 60/150 Vis | 3 | 3 | 4 | 3 | 4 | 5 | 6 | 6 |
| 60/160 Flex | 2 | 2 | note[1] | 2 | 2 | 2 | 1 | 1 | note[1]
strong adhesion to PET film

The samples using R16 or R9 glycidylether crosslinkers showed higher % gel compared to the samples with water soluble epoxy resin crosslinker.

The samples using R11, the glycidylether crosslinkers with two glycidyl groups per molecule showed only slightly higher % gel compared to the samples with water soluble epoxy resin crosslinker.

The samples using R-11, the crosslinker with two glycidyl groups per molecule, showed inferior gel % compared to the other R16 and R9 supertetraglycidylether crosslinkers.

Example 2

Samples (C)29 to 33

"Gentle" mixing was performed by adding the crosslinker to the aqueous polymer dispersion under mixing in a glass beaker using a magnetic agitator.

High Shear mixing ("H.S.") was performed by adding dropwise the aqueous polymer dispersion to the crosslinker in a metallic beaker under mixing at high speed (above 2000 rpm) using a high speed rotor/stator mixer (Rayneri-Group VMI Turbotest, type 33-300, power 300 W, capable of 0 to 3300 rpm).

Films were dried for 30 min at 105° C. Gel % and SWI were measured on films 400 micrometer thick with toluene. Tensile and solvent resistance test films were 600 micrometers thick. Films were further cured 30 min at 130° C. and stored at least three days in a controlled humidity and temperature room prior to tensile and solvent resistance tests.

|  | C29 | 30 | 31 | 32 | 33 |
|---|---|---|---|---|---|
| Latex | L1 | L1 | L1 | L1 | L1 |
| pbw of Latex | 100 | 100 | 100 | 100 | 100 |
| XL | none | R9D | R9D | R-9 | R-9 |
| pbw of XL | 0 | 3 | 3 | 3 | 3 |
| Method of mixing Latex with XL | none | gentle | H.S. | H.S. | H.S. |
| pbw of paratoluenesulfonic acid | 0 | 0 | 0 | 0 | 0.2 |
| Gel % | 44 | 93.5 | 93.5 | 93.5 | 94.4 |
| SWI | 31 | 3 | 2.5 | 2.9 | 3.9 |
| Ethanol Resistance at 5 min. | 2 | 5 | 4 | 5 | 5 |
| Ethanol Resistance at 60 min. | 1 | 4 | 4 | 5 | 5 |
| Water Resistance at 1 hour | 5 | 5 | 5 | 5 | 5 |
| Water Resistance at 16 hours | 5 | 3 | 1 | 4 | 5 |

All the samples with crosslinker had acceptable properties. The samples with R-9 had better overall solvent resistance that those with R9D.

Samples C34 to 39

Samples C35 and C36 were mixed with high shear mixing. Samples C37-C39 were mixed with gentle mixing because the crosslinkers are water dispersible. Tests were performed as in Samples C29 to 33.

|  | C34 | C35 | 36 | C37 | C38 | C39 |
|---|---|---|---|---|---|---|
| Latex | L1 | L1 | L1 | L1 | L1 | L1 |
| pbw of Latex | 100 | 100 | 100 | 100 | 100 | 100 |
| XL | none | R-11 | R-9 | W78 | XL-702 | EX-9345 |
| pbw of XL | 0 | 3 | 3 | 3 | 3 | 3 |
| Tensile[3] | 10.4 | 16.1 | 15.7 | 15.1 | 10 | 11.5 |
| Elong[4] | 330 | 280.5 | 200 | 280.5 | 330 | 196 |
| Ethanol Resistance at 5 min. | 2 | 5 | 5 | 3 | 2 | 1 |
| Ethanol Resistance at 60 min. | 1 | 5 | 5 | 4 | 1 | 1 |
| Water Resistance at 1 hour | 5 | 5 | 5 | 5 | 5 | 5 |
| Water Resistance at 16 hours | 5 | 5 | 4 | 2 | 4 | 4 |

Note[3]
Stress at break in a tensile test (Newton per square millimeter).
Note[4]
Maximum elongation at break (%).

Only the samples with glycidyl ether crosslinker showed good ethanol resistance and good water resistance.

Samples C40 to 46

Samples were mixed with high shear mixing. Solvent resistance was performed as in Samples C29 to 33. The Gel %, Tg, and SWI tests were performed on films made from the latex film, cast without addition of crosslinker ("nXL" denotes tests performed on non-crosslinked samples).

|  | C40 | 41 | 42 | 43 | 44 | 45 | 46 |
|---|---|---|---|---|---|---|---|
| Latex | L1 | L1 | L3 | L4 | L5 | L6 | L7 |
| pbw of Latex | 100 | 100 | 100 | 100 | 100 | 100 | 100 |
| XL | none | R-9 | R-9 | R-9 | R-9 | R-9 | R-9 |
| pbw of XL | 0 | 3 | 3 | 3 | 3 | 3 | 3 |
| nXL Gel % | 44 | 44 | 46 | 82.5 | 90 | 0 | 84 |
| nXL Tg (° C.) | 18 | 18 | 28 | 26 | 17 | 26 | 32 |
| nXL SWI | 31 | 31 | 38 | 12 | 8 | 0 | 84 |
| Ethanol Resistance at 5 min. | 2 | 5 | 5 | 5 | 5 | 5 | 5 |
| Ethanol Resistance at 60 min. | 1 | 5 | 5 | 5 | 5 | 5 | 5 |
| Water Resistance at 1 hour. | 5 | 5 | 5 | 5 | 4 | 4 | 5 |
| Water Resistance at 16 hour. | 5 | 4 | 4 | 3 | 4 | 3 | 5 |

Sample 47

Sample 47 contains latex polymer L1 (100 parts by dry weight) mixed at high speed with R-9 (3 parts by weight). Sample 47 was stored undisturbed for 86 days at room temperature (approximately 20° C.). Samples were taken from the top of the container, the bottom of the container, and from the sample after it was re-mixed vigorously to ensure full homogenization. Results were as follows:

| top pH | bottom pH | re-mixed pH | top solids % | bottom solids % | re-mixed solids % |
|---|---|---|---|---|---|
| 8.3 | 8.3 | 8.3 | 45.4 | 45.4 | 45.5 |

A duplicate of Example 47 was stored undisturbed at room temperature and tested as follows:

| top gel % | bottom gel % | re-mixed gel % | top SWI | bottom SWI | re-mixed SWI |
|---|---|---|---|---|---|
| 80.8 | 80.3 | 80.5 | 4.1 | 4.0 | 3.7 |

Example 47 is a stable dispersion.

We claim:

1. A stable aqueous dispersion comprising
   (a) dispersed particles of one or more film-forming polymer, wherein said dispersed particles consist of polymers made from monomers consisting of 10% to 90% by weight vinyl aromatic monomer, 10% to 90% by weight alkyl esters of (meth)acrylic acid and 1% to 10% by weight (meth)acrylic acid, and
   (b) one or more multiglycidyl compound having 4 or more glycidyl groups per molecule, wherein each of said glycidyl groups is a glycidyl ether group having the structure

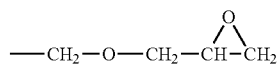

wherein said aqueous dispersion contains no compound (b) that has any amino groups,
wherein said film-forming polymer has glass transition temperature of −25° C. or higher, and
wherein said film-forming polymer has glass transition temperature of 35° C. or lower.

2. The aqueous dispersion of claim 1, wherein said dispersion was made by a process comprising the step of bringing the pH of said dispersion from a value below 7 to a value above 7.5 by addition of one or more fugitive base.

3. The aqueous dispersion of claim 1, wherein said dispersion was made by a process comprising the step of subjecting a mixture of all the ingredients of said dispersion to high-speed emulsification.

4. The method of making a saturated porous substrate comprising saturating said porous substrate with the composition of claim 1.

5. A saturated porous substrate made by a process comprising the method of claim 4 and further comprising crosslinking said dispersion or allowing said dispersion to crosslink.

6. The aqueous dispersion of claim 1, wherein said aqueous dispersion contains no compound that is capable of forming crosslinks with the polymer chains in the dispersed particles of the present invention and that has any nitrogen atoms.

7. The aqueous dispersion of claim 1, wherein said dispersion has pH of 7.5 or higher, and wherein said dispersion additionally comprises one or more water-soluble fugitive base having boiling point at one atmosphere pressure of 20° C. or lower.

8. The aqueous dispersion of claim 7, wherein said fugitive base is selected from the group consisting of ammonia, methylamine, other alkyl amines, and mixtures thereof.

9. The aqueous dispersion of claim 1, wherein said dispersion consists of
(a) said dispersed particles, wherein said dispersed particles consist of polymers made from monomers consisting of
10% to 90% by weight vinyl aromatic monomer
10% to 90% by weight alkyl esters of (meth)acrylic acid
1% to 10% by weight (meth)acrylic acid,
wherein said dispersed particles are produced by emulsion polymerization,
(b) said muitiglycidyl compound,
(c) one or more fugitive base, and
(d) optionally, one or more compounds selected from the group consisting of surfactants, wetting agents, antifoaming agents, pigments, dispersants, catalysts, non-film-forming resins, and mixtures thereof.

10. The aqueous dispersion of claim 1, wherein said multiglycidyl compound has molecular weight of 600 or less.

* * * * *